US008719497B1

(12) United States Patent
Don et al.

(10) Patent No.: US 8,719,497 B1
(45) Date of Patent: May 6, 2014

(54) USING DEVICE SPOOFING TO IMPROVE RECOVERY TIME IN A CONTINUOUS DATA PROTECTION ENVIRONMENT

(75) Inventors: Arieh Don, Newton, MA (US); Assaf Natanzon, Ramat-Gan (IL); Michael Scharland, Franklin, MA (US); David Meiri, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 140 days.

(21) Appl. No.: 13/238,426

(22) Filed: Sep. 21, 2011

(51) Int. Cl.
*G06F 13/00* (2006.01)
*G06F 13/28* (2006.01)

(52) U.S. Cl.
USPC ............ 711/114; 711/162; 711/E12.103; 713/100; 707/674

(58) Field of Classification Search
USPC .......... 711/114, 162, E12.103; 713/100; 707/674
See application file for complete search history.

(56) References Cited

U.S. PATENT DOCUMENTS

| 6,691,245 | B1* | 2/2004 | DeKoning | 714/6.31 |
| 8,566,635 | B2* | 10/2013 | Qi et al. | 714/6.3 |
| 2005/0015663 | A1* | 1/2005 | Armangau et al. | 714/15 |
| 2005/0193238 | A1* | 9/2005 | Golasky et al. | 714/6 |
| 2008/0147962 | A1* | 6/2008 | Diggs et al. | 711/103 |
| 2008/0270695 | A1* | 10/2008 | Ninose | 711/114 |
| 2009/0031096 | A1* | 1/2009 | Smith et al. | 711/162 |
| 2010/0138395 | A1* | 6/2010 | D'Souza et al. | 707/668 |

* cited by examiner

*Primary Examiner* — Edward Dudek, Jr.
(74) *Attorney, Agent, or Firm* — Daly, Crowley, Mofford & Durkee, LLP

(57) ABSTRACT

In one aspect, a method includes providing a first storage volume to receive I/Os from a host and having a device ID, providing a second storage volume to receive the I/Os and having a device ID and performing a recovery that includes rebooting the host and recognizing, at the host, the second storage volume as the first storage volume using the device ID of the second storage volume being identical to the device ID of the first storage volume. The first storage volume is in an active mode and the second storage volume is in a passive mode.

20 Claims, 5 Drawing Sheets

USING DEVICE SPOOFING TO IMPROVE RECOVERY TIME IN A CONTINUOUS DATA PROTECTION ENVIRONMENT

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

SUMMARY

In one aspect, a method includes providing a first storage volume to receive I/Os from a host and having a device ID, providing a second storage volume to receive the I/Os and having a device ID and performing a recovery that includes rebooting the host and recognizing, at the host, the second storage volume as the first storage volume using the device ID of the second storage volume being identical to the device ID of the first storage volume. The first storage volume is in an active mode and the second storage volume is in a passive mode.

In a further aspect, an article includes a non-transitory machine-readable medium that stores executable instructions. The instructions cause a machine to perform a recovery. The instructions causing the machine to perform a recovery includes instructions causing the machine to recognize, at a host, a second storage volume as a first storage volume after booting the host by using a device ID of the second storage volume. The second storage volume has the same device ID as a device ID of the first storage volume.

In a further aspect, a continuous data protection system includes circuitry configured to perform a recovery. The circuitry to perform recovery includes circuitry to recognize, at a host, a second storage volume as a first storage volume after booting the host by using a device ID of the second storage volume. The device ID of the second storage volume is the same as a device ID of the first storage volume.

DETAILED DESCRIPTION

Described herein is an approach to improve recovery time in a continuous data protection environment. In particular, the methods and techniques described herein use device ID spoofing to cause a host to determine that newly added storage devices are just new paths to an already existing storage device. Thus, the host is mislead to determine a backup storage device as if it is the same as the original storage device, thereby saving the host a considerable amount of time in discovering the new storage devices. As will be shown, when a host is rebooted significant time is saved if the host determines that the newly added storage device is the same as the failed storage device.

Figure 1:
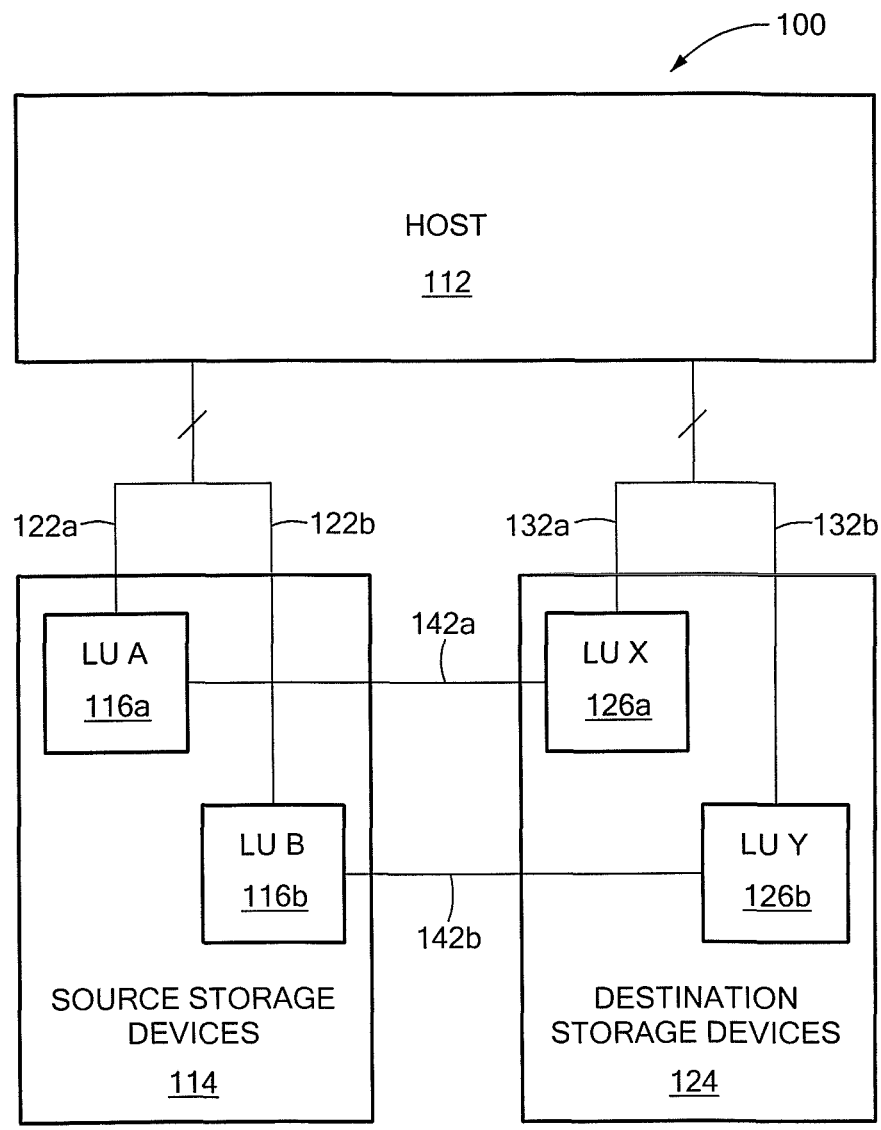
FIG. 1 is a block diagram of an example of a continuous data protection system.

Referring to FIG. 1, a continuous data protection system 100 includes a host 112, source storage devices 114 that include a logical unit (LU) A 116a and an LU B 116b and destination storage devices 124 that include an LU X 126a and an LU Y 126b. The LU A 116a is connected to the host 112 through a source path 122a and the LU B 116b is connected to the host 112 through a source path 122b. The LU X 126a is connected to the host 112 through a destination path 132a and the LU Y 126b is connected to the host 112 through a destination path 132b.

The LU X 126a is configured to have the same device ID as the LU A 116a and LU Y 126b is configured to have the same device ID as the LU B 116b.

The source storage devices 114 on the source paths 122a-122b and the destination storage devices 124 on the destination paths 132a-132b may be in an active mode or a passive mode. If a device on paths 122a-122b, 132a-132b is in the active mode, all SCSI I/Os commands are processed by the device on that path. If a device on the paths 122a-122b, 132a-132b is in the passive mode, read and write SCSI commands (and their like) will not be processed by the device on the passive path, but non-data SCSI commands (e.g., control commands such as Inquire, Read Capacity and so forth) will get processed.

In a normal state, the devices 114 (e.g., LU A 116a and LU B 116b) on the source paths 122a-122b are in the active mode and the devices 124 (e.g., LU X 126a and LU Y 126b) on the destination paths 132a-132b are in the passive mode. The host 112 sends I/Os (e.g., reads I/Os and write I/Os) to be executed at the source storage devices 114. For example, the host 112 sends I/Os to the LU A 116a and to the LU B 116b. To protect the data stored at the source storage devices 114, the data is also sent to the destination storage devices 124. In particular, data sent to the LU A 116a is also sent to the LU X 126a through a connection 142a and data sent to the LU B 116b is also sent to a LU Y 126b through connection 142b.

If the source storage devices 114 crash, are corrupted or are involved in a disaster such as an earthquake and so forth, the source storage devices 114 cannot be used as a primary site to store I/Os. The destination storage devices 124 will take over as the primary site. Normally, before the destination storage devices 124 take over, the source storage devices on the source paths 122a-122b are placed in the passive mode from the active mode, the devices on the destination paths 132a-132b are placed in the active mode from the passive mode and the host 112 is rebooted. When the host 112 is rebooting it discovers the devices (e.g., storage devices it is connected to). When new devices are presented to a host, the rebooting time can be significant (e.g., in situations where there are thousands of newly discovered storage devices), because each device has to be discovered, mounted and any device-specific application associations must be added. Such lengthy discovery is not needed when adding new paths to existing storage devices. Thus, by having the destination storage devices 124 (e.g., LU X 126a, LU Y 126b) spoof device IDs of the source storage devices 114 (e.g., LU A 116a, LU B 116b), the host 112 does not need to discover and mount any new devices or perform any device-specific application associations because it assumes that the destination storage devices 124 are new paths into the source storage devices 114 already discovered, thereby improving recovery time significantly. Such faster discovery of destination storage devices 124 allows the host 112 to start using the destination storage devices 124 faster, and to enable a faster recovery from a disaster by finding a point it time without corruption faster.

Figure 2:
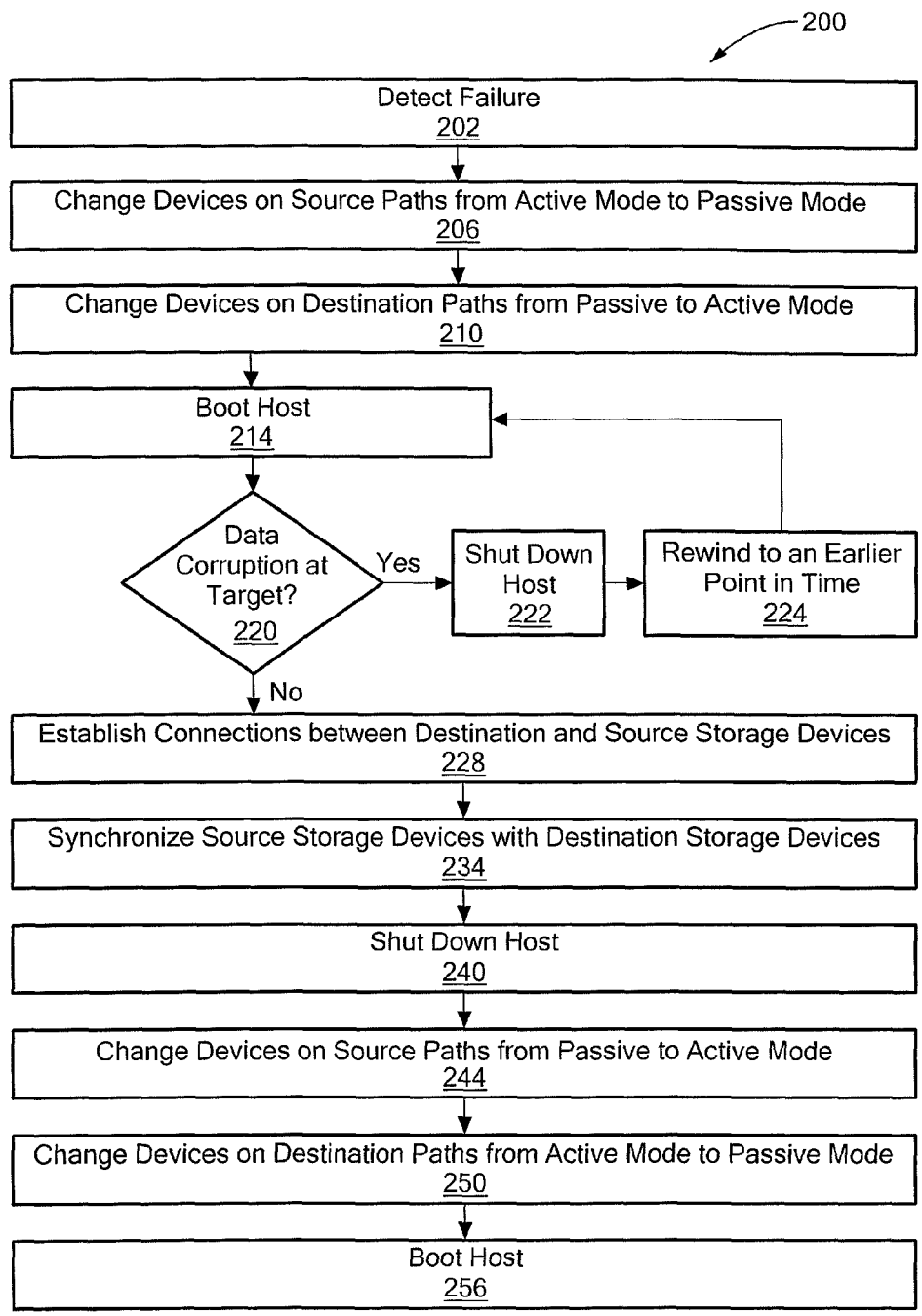
FIG. 2 is a flowchart of an example of a process to use device spoofing to improve recovery time in a continuous data protection system.

Referring to FIG. 2, an example of a process to use device spoofing to improve recovery time in a continuous data protection system is a process 200. After the source storage devices 114 becomes unavailable (e.g., due to data corruption, a catastrophe and so forth) and the host 112 crashes, the continuous data protection system 100 attempts to recover back to a normal state.

Process 200 detects a failure at the storage devices 114 (202). Process 200 changes the source storage devices 114 on the source paths 122-122b from an active mode to a passive mode (206) and changes the destination storage devices 124 on the destinations paths 132a-132b from the passive mode to the active mode so that the destination storage devices 124 can respond to I/Os (210).

Process 200 boots the host 112 (214) and determines if the data has been corrupted at the destination storage devices 124 (220) and if the data has been corrupted, process 200 shuts down the host 112 (222) and rewinds the data on the destination storage devices 124 to an earlier point in time (PIT) (224). Process 200 boots the host (214) and determines if the data has been corrupted at the destination storage devices 124 (220). Process 200 repeats processing blocks 214, 220, 222 and 224 until a point in time is found that data is not corrupted.

If the data on the destination storage devices 124 is not corrupted, process 200 establishes connections between the source storage devices 114 and the destination storage devices 124 (228) and synchronizes the source storage devices 114 with the destination storage devices 124 (234). For example, the data stored on the LU X 126a is sent to the LU A 116a through the connection 142a and the data stored on the LU Y 126b is sent to the LU B 116b through the connection 142b.

Process 200 shuts down the host 112 (240), changes the source storage devices 114 on the source paths 122a-122b from passive mode to active mode (244) and changes the destination storage devices 124 on the destination paths 132a-132b from the active mode to the passive mode (250). Process 200 boots the host 112 (256) and the continuous data protection system 100 has now recovered.

Figure 3:
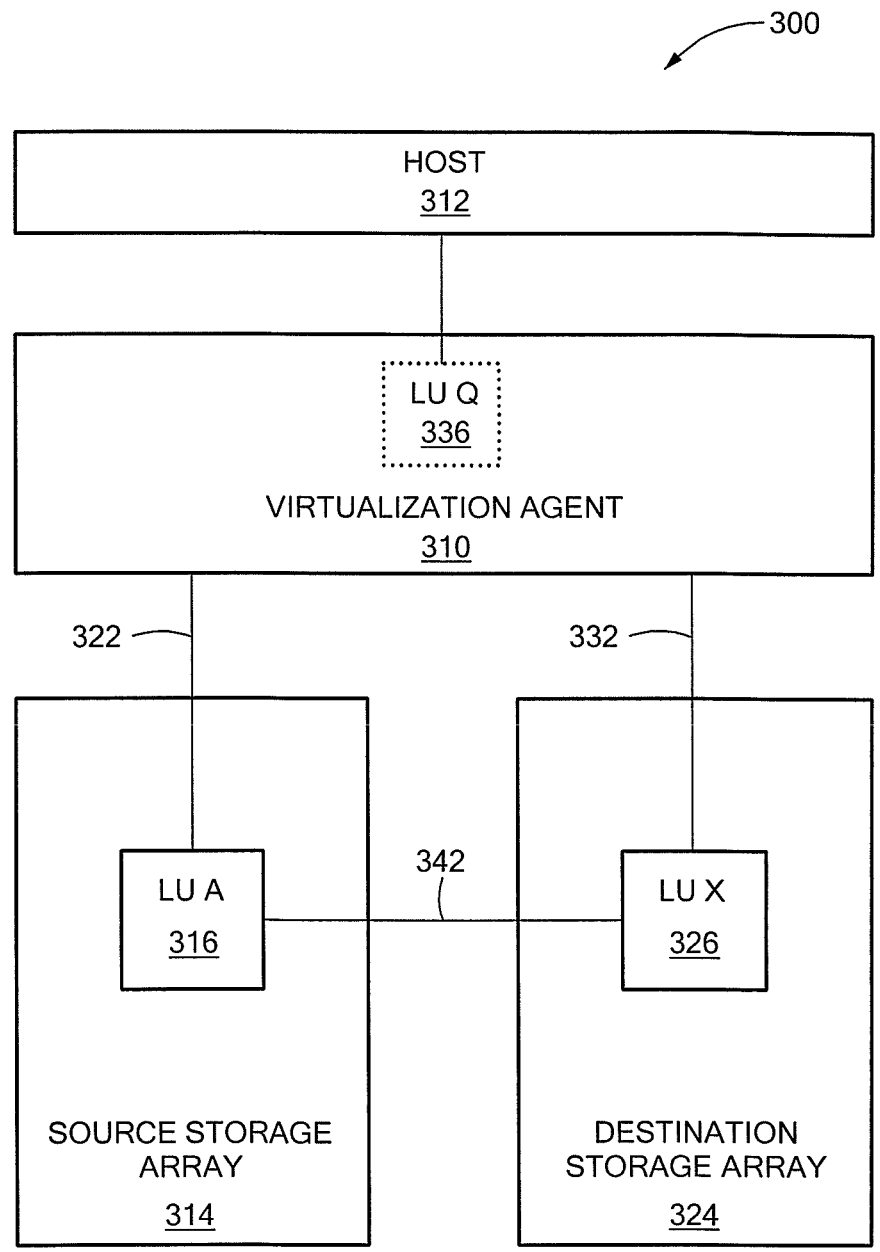
FIG. 3 is a block diagram of an example of a continuous data protection system that includes virtualization.

Referring to FIG. 3, using device spoofing can be used in other continuation data protection environments such as those continuous data protection environments that include virtualization. For example, a continuous data protection system 300 includes a host 312, a virtualization agent 310 that includes a virtual volume LU Q 336, a source storage array 314 that includes a LU A 316 and a destination storage array 324 that includes a LU X 326.

The LU A 316 is connected to the virtualization agent 310 through a source path 322. The LU A 316 is in the active mode.

The LU X 326 is connected to the virtualization agent 310 through a destination path 332. The LU X 326 is in the passive mode.

The LU X 326 is configured to have the same device ID as the LU A 316. The LU X 326 is connected to the LU A 316 through a connection 342.

In a normal state, the host 312 sends commands (e.g., read or writes) to a LU Q 336 at the virtualization agent 310. Since the LU Q 336 is a virtual representation of a storage device, LU Q 336 sends the commands to LU A 316. The LU A 316 sends the write commands to the LU X 326 through the connection 342.

Figure 4:
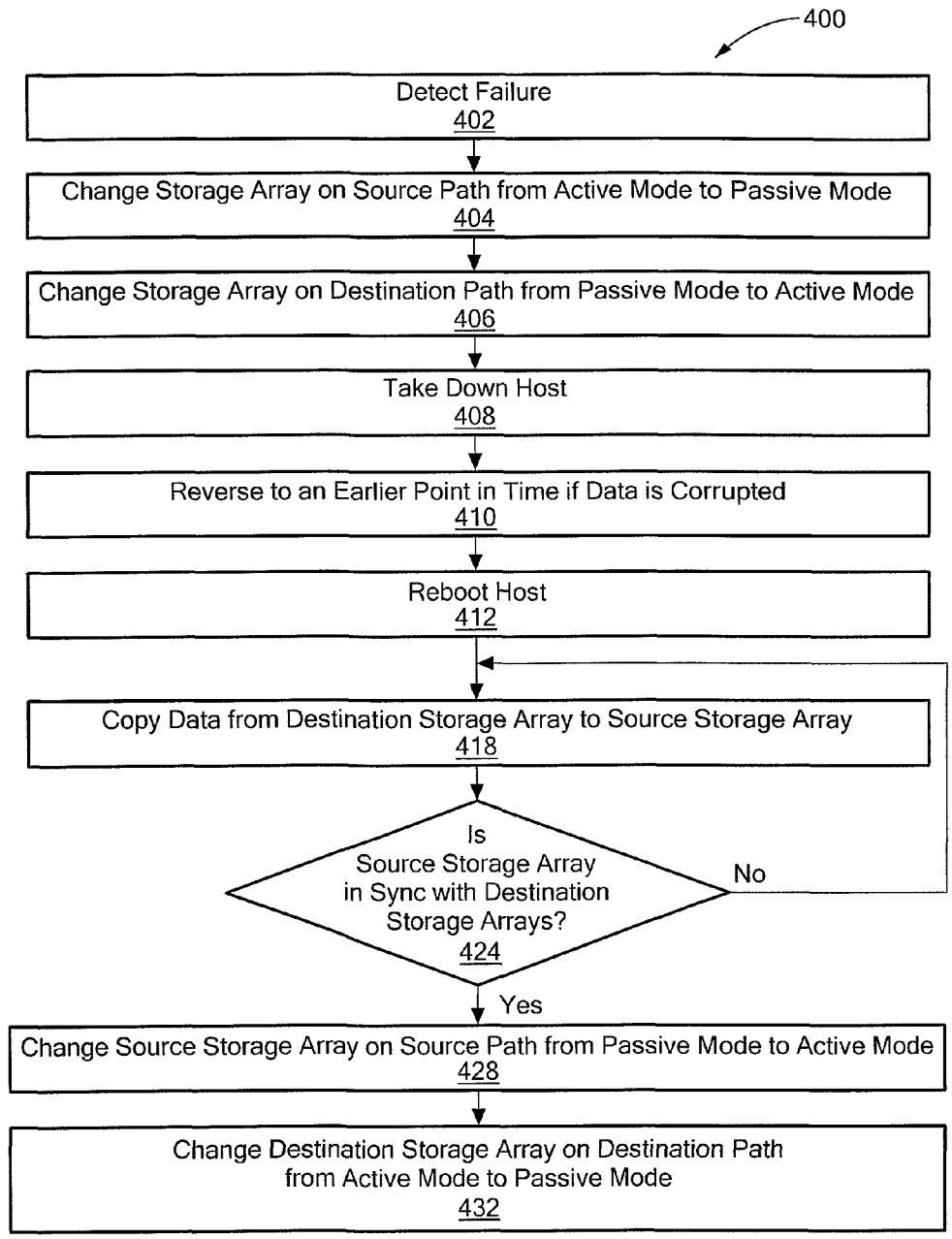
FIG. 4 is a flowchart of an example of a process to use device spoofing to improve recovery time in a continuous data protection system that includes virtualization.

Referring to FIG. 4, an example of a process to use device spoofing to improve recovery time in a continuous data protection system that includes virtualization is a process 400. After the source storage array 314 become unavailable (e.g., due to data corruption, a catastrophe and so forth) and the host 312 crashes due to its unavailability, the user will use the continuous data protection system 300 in an attempt to recover back to a valid copy of the data.

Process 400 detects a failure (402) and changes the source storage array 314 on the source path 322 from the active mode to the passive mode (404) and changes the destination storage array 324 on the destination path 332 from the passive mode to the active mode (406). Process 400 takes the host down (408) and reverses the data on the LU X 326 to an earlier point in time if the data had been corrupted (410).

Process 400 reboots the host 312 (412). Since the LU X 326 spoofs the identity of the LU A 316, the LU Q 336 accesses LU X 326 faster than if the LU X 326 had a different device ID than LU A 316 because the LU Q 336 does not need to scan and discover new devices. Since the LU A 316 and LU X 326 were already discovered during normal operation when the LU Q 336 was communicating with the LU A 316, LU Q 336 discovers the device ID of the LU X 326 and treats the LU X 326 as if it was LU A 316.

While new I/Os are being sent from the host 312 to the LU Q 336 at the virtualization agent 310 and from the LU Q 336 to the LU X 326, process 400 copies the data from the LU X 326 to the LU A 316 through the connection 342 (418) and determines when the LU A 316 is in synch with the LU X 326 (424).

If the LU A 316 is in sync with the LU X 326, process 400 changes the source devices (e.g., LU A 316) on the source path 322 from the passive mode to the active mode (428) and the destination devices (e.g., LU X 326) on the destination path 332 from an active mode to passive mode (432). In one example, the LU X 326 provides instructions to perform processing blocks 418 and 424, for example, by including instructions embedded in one or more I/Os.

Figure 5:
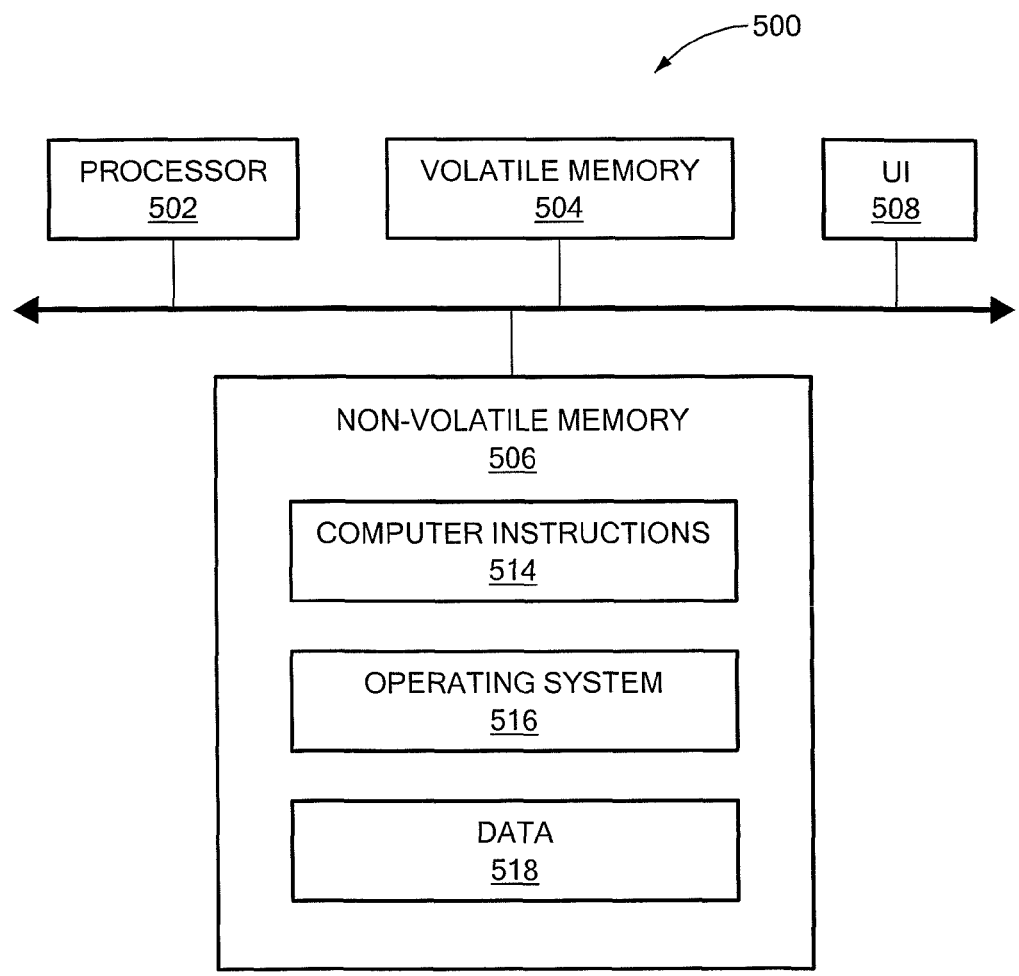
FIG. 5 is a computer on which any of the processes of FIG. 3 or 5 may be implemented.

Referring to FIG. 5, a computer 500 includes a processor 502, a volatile memory 504, a non-volatile memory 506 (e.g., hard disk) and a user interface (UI) 508 (e.g., a mouse, a keyboard, a display, touch screen and so forth). The non-volatile memory 506 stores computer instructions 514, an operating system 516 and data 518. In one example, the computer instructions 514 are executed by the processor 502 out of volatile memory 504 to perform all or part of the processes described herein (e.g., processes 200 and 400).

The processes described herein (e.g., processes 200 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes 200 and 400 are not limited to the specific processing order of FIGS. 2 and 4 respectively. Rather, any of the processing blocks of FIGS. 2 and 4 may be re-ordered, combined or removed, performed in parallel or in serial, as necessary, to achieve the results set forth above.

The processing blocks (for example, processes 200 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
providing a first storage volume to receive I/Os from a host and having a device ID, the first storage volume is in an active mode;
providing a second storage volume to receive the I/Os from the first storage volume to replicate the first storage volume and having a device ID, the second storage volume is in a passive mode; and
performing a recovery of the first storage volume comprising:
shutting down a host;
changing the second storage volume from the passive mode to the active mode after shutting down the host;
changing the first storage volume from the active mode to the passive mode after shutting down the host;
booting the host after changing the second storage volume from the passive mode to the active mode and changing the first storage volume from the active mode to the passive mode; and
recognizing, at the host, the second storage volume as the first storage volume using the device ID of the second storage volume being identical to the device ID of the first storage volume.

2. The method of claim 1 wherein performing the recovery, further comprises:
synchronizing the first storage volume with the second storage volume after booting the host.

3. The method of claim 2 wherein performing the recovery, further comprises, after synchronizing the first storage volume with the second storage volume:
changing the first storage volume from the passive mode to the active mode;
changing the second storage volume from the active mode to the passive mode; and
booting the host after changing the first storage volume from the passive mode to the active mode and changing the second storage volume from the active mode to the passive mode.

4. The method of claim 3 wherein changing the second storage volume from the active mode to the passive mode comprises changing the second storage volume from the active mode to the passive mode for read I/Os and write I/Os.

5. The method of claim 1 wherein performing the recovery, further comprises:
determining if data is corrupted at the second storage volume;
shutting down the host if the data is corrupted at the second storage volume;
rewinding the second storage volume to an earlier point in time after shutting down the host.

6. The method of claim 1 wherein changing the first storage volume from the active mode to the passive mode comprises changing the first storage volume from the active mode to the passive mode for read I/Os and write I/Os.

7. The method of claim 1, further comprising providing a virtualization agent coupled to the first storage volume and the second storage volume.

8. An article comprising:
a non-transitory machine-readable medium that stores executable instructions to perform a recovery of a first storage volume, the instructions causing a machine to:
shut down a host;
change the first storage volume from a passive mode to an active mode after shutting down the host;

change a second storage volume from the active mode to the passive mode after shutting down the host, the second storage volume to receive I/Os to replicate the first storage volume;

boot the host after changing the first storage volume from the passive mode to the active mode and changing the second storage volume from the active mode to the passive mode; and recognize, at the host, the second storage volume as the first storage volume after booting the host by using a device ID of the second storage volume, wherein the second storage volume has the same device ID as a device ID of the first storage volume.

9. The article of claim 8, further comprising instructions causing the machine to:

synchronize the first storage volume with the second storage volume after booting the host.

10. The article of claim 9 wherein the instructions causing the machine to synchronize the first storage volume with the second storage volume comprises instructions causing the machine to:

change the first storage volume from the passive mode to the active mode; and change the second storage volume from the active mode to the passive mode;

boot the host after changing the first storage volume from the passive mode to the active mode and changing the second storage volume from the active mode to the passive mode.

11. The article of claim 10 wherein the instructions causing the machine to change the second storage volume from the active mode to the passive mode comprises instructions causing the machine to change the second storage volume from the active mode to the passive mode for read I/Os and write I/Os.

12. The article of claim 8 further comprising instructions causing the machine to:

determine if data is corrupted at the second storage volume;

shut down the host if the data is corrupted at the second storage volume; and rewind the second storage volume to an earlier point in time after shutting down the host.

13. The article of claim 8 wherein the host is configured to provide I/Os to a virtualization agent, and wherein the virtualization agent provides the I/Os to at least one of the first storage volume and the second storage volume.

14. A continuous data protection system, comprising:

circuitry configured to perform a recovery comprising circuitry configured to:

shut down a host;

change a first storage volume from a passive mode to an active mode after shutting down the host;

change a second storage volume from the active mode to the passive mode after shutting down the host;

boot the host after changing the first storage volume from the passive mode to the active mode and changing the second storage volume from the active mode to the passive mode; and recognize, at the host, the second storage volume as the first storage volume after booting the host by using a device ID of the second storage volume, wherein the device ID of the second storage volume is the same as a device ID of the first storage volume.

15. The continuous data protection system of claim 14 wherein the circuitry comprises at least one of a processor, a memory, programmable logic and logic gates.

16. The continuous data protection system of claim 14 wherein the circuitry to perform the recovery, further comprises circuitry to:

synchronize the first storage volume with the second storage volume after booting the host.

17. The continuous data protection system of claim 16 wherein the circuitry to perform the recovery, further comprises, after synchronizing the first storage volume with the second storage volume, circuitry to:

change the first storage volume from the passive mode to the active mode;

change the second storage volume from the active mode to the passive mode; and boot the host after changing the first storage volume from the passive mode to the active mode and changing the second storage volume from the active mode to the passive mode.

18. The continuous data protection system of claim 17 wherein the circuitry to change the second storage volume from the active mode to the passive mode comprises circuitry to change the second storage volume from the active mode to the passive mode for read I/Os and write I/Os.

19. The continuous data protection system of claim 14 wherein circuitry to perform the recovery, further comprises circuitry to;

determine if data is corrupted at the second storage volume;

shut down the host if the data is corrupted at the second storage volume; and rewind the second storage volume to a point in time that the data is not corrupted after shutting down the host.

20. The continuous data protection system of claim 14 wherein the host is configured to provide I/Os to a virtualization agent, and wherein the virtualization agent provides the I/Os to at least one of the first storage volume and the second storage volume.

* * * * *